United States Patent Office 3,479,286
Patented Nov. 18, 1969

3,479,286
FLAME-EXTINGUISHING COMPOSITIONS
Gian Paolo Gambaretto, Padova, Paolo Rinaldo, Venice, and Mario Palato, Padova, Italy, assignors to Montecatini Edison S.p.A., Milan, Italy, a corporation of Milan, Italy
No Drawing. Filed Sept. 19, 1966, Ser. No. 580,212
Claims priority, application Italy, Sept. 22, 1965, 21,090/65
Int. Cl. A62d 1/00
U.S. Cl. 252—8     2 Claims

ABSTRACT OF THE DISCLOSURE

A flame-extinguishing composition containing a completely halogenated alkane, having at least two fluorine atoms and at least one bromine atom per molecule and a fluorohydrocarbon having at least one hydrogen atom per molecule. The composition can include, optionally, a propellant such as sulfur-hexafluoride and carbon dioxide. The molar ratio of the fluoro-hydrocarbon to the completely halogenated alkane ranges between substantially 0.2 and 5.

Our present invention relates to flame-extinguishing compositions containing high molecular weight, low carbon number haloalkanes and, more particularly, to improved first-extinguishing compositions containing brominated Freons, i.e. fluorobromoalkanes and fluorochlorobromoalkanes.

It is known that brominated fluoro carbons of the Freon type (i.e. having one or two carbon atoms and 4 or 6 halogen atoms, primarily bromine and fluorine) have flame-extinguishing properties alone or in combination with other substances. Such compounds may be used as propellants for liquids or gases and thus imparts a flame-extinguishing character to the mixture dispensed. Since these compounds are generally nontoxic or are of low toxicity, they do not possess the disadvantages of such flame-extinguishing materials as carbon tetrachloride and other chemical compounds which are corrosive or chemically react with their environment.

Apparently, the bromine atom or atoms in the molecule provide carbon-bromine bonds activatable at low energies and thus at relatively low temperatures to produce free radicals which serve as chain-terminating reactants when they are involved in the chain reactions of the combustion process. In effect, therefore, the flame-extinguishing fluorobromoalkanes act as chain-reaction moderators or limiters by removing possible reaction participants from the combustion zone. Another advantage of the use of such compounds as flame-extinguishing substances is that the relatively high fluorine content and the proportionally low chlorine content or even the absence of chlorine ensure that the compound will be sufficiently volatile to be used effectively in the flame-extinguishing process at low ambient temperatures and, further, that the flame-extinguishing substance will not break down to poisonous or toxic compounds such as phosgene. The high vapor density of these products permits of their use in open spaces since they remain for prolonged periods in the combustion zone and are not readily dispersed by diffusion.

Furthermore, the bromofluoro mono- and dialkanes and especially the bromofluoro methanes and ethanes having at least two fluorine atoms and one bromine atom are characterized by a comparatively low toxicity, particularly when contrasted with the chloromethanes and bromomethanes (e.g. carbon tetrachloride, methylbromide and chlorobromomethanes) commonly used heretofore in flame-extinguishing compositions. To demonstrate the relative toxicities of the haloalkanes, we list below in Table I the toxicities of various haloalkanes in accordance with the Underwriters Laboratories (UL) classification which indicates a decrease in toxicity from class 1 to class 6. In class 1, compounds such as sulfur dioxide are included whereas trifluorobromomethane ($CBrF_3$) is considered to be in class 6. Compounds such as carbon tetrachloride are the most toxic of the haloalkanes (class 3).

TABLE I.—TOXICITY OF HALOALKANES

| Compound: | U.L. Class |
|---|---|
| $CCl_4$ | 3 |
| $CCl_3F$ | 5a |
| $CCl_2F_2$ | 6 |
| $CClF_3$ | 6 |
| $CF_4$ | 6 |
| $CHCl_3$ | 3 |
| $CHCl_2F$ | 5 |
| $CHClF_2$ | 5a |
| $CHF_3$ | 6 |
| $(CHCl_3)$ | 3 |
| $(CCl_3F)$ | 5a |
| $CH_2Cl_2$ | 4–5 |
| $(CHCl_2F)$ | 5 |
| $CCl_2F_2$ | 6 |
| $CBr_2F_2$ | 4 |
| $CBrF_3$ | 6 |
| $CClBrF_2$ | 5a |
| $CClF_3$ | 6 |
| $(CClBrF_2)$ | 5a |
| $(CBrF_3)$ | 6 |
| $CH_3Br$ | 2 |
| $(CBrF_3)$ | 6 |
| $CH_2ClBr$ | 3 |
| $(CClBrF_2)$ | 5a |

The use of brominated Freons (e.g. bromofluoromethanes) in commercial flame-extinguishing compositions and as flame-extinguishing agents has heretofore been strictly limited because of the high costs of these compounds. Thus it has been necessary to employ less efficient flame-extinguishing agents as propellants and the like because of economical considerations.

It is, therefore, the principal object of the present invention to provide an improved flame-extinguishing composition of matter with highly efficient flame-extinguishing properties but of relatively low cost.

Another object of this invention is to provide a flame-extinguishing low-cost propellant which is free from the disadvantaged characterizing toxic haloalkanes.

We have found that these objects can be attained with a flame-extinguishing composition of matter which comprises at least one brominated Freon (e.g. a bromofluoromethane or ethane containing at least two fluorine atoms and at least one bromide atom) in combination with one or more fluorochlorohydrocarbons containing at least one hydrogen atom per molecule. It has been discovered, surprisingly, that the combination of a fluorochlorohydrocarbon containing at least one hydrogen atom per molecule with the bromofluoroalkane imparts to the flame-extinguishing combination synergistic effects with respect to the flame-extinguishing qualities even though the use of a fluorochlorohydrocarbon of this nature might be thought to decrease the fire-extinguishing characteristics because of its own properties. Furthermore it has been found that the combination (i.e. the combination of at least one completely halogenated bromofluoromethane or ethane with at least one fluorochlorohydrocarbon—containing at least one hydrogen atom per molecule—) does not increase the toxicity of the flame-extinguishing system above that to be expected from the bromofluorohydrocarbon alone. Moreover, the fluorochlorohydrocarbon acts as a propellant for the brominated Freon and greatly facilitates the use of the composition as a flame-extinguishing agent.

Thus the mixture of fluorochlorohydrocarbons with brominated Freon gave rise to compositions with a relatively high flame-extinguishing efficiency.

The propelling coadjuvant for the brominated Freon should, according to the present invention, consist of a fluorochlorohydrocarbon (having at least one hydrogen atom per molecule) of relatively low toxicity, low boiling point, high solubility in the chlorinated Freon and good ability to generate chain-reaction-terminating free radicals by thermal decomposition. The propellant and coadjuvant fluorinated hydrocarbons should have a carbon number of one or two, a fluorine content per molecule of at least two and at least one hydrogen atom per molecule; fluorine-containing chlorinated hydrocarbons containing at most one atom of chlorine per molecule are also suitable. Best results are obtained with coadjuvants such as $CF_2ClH$, $CF_3H$, $CF_2H_2$ and $CF_2-CF_2H$. The brominated Freons are preferably one or two carbon fully halogenated haloalkanes having at least two fluorine atoms and at least one bromine atom per molecule. Best results are obtained with $CF_2ClBr$, $CF_2Br-CF_2Br$, $CF_2Br_2$ and $CF_3Br$.

While the optimum ratio of the fluorinated hydrocarbon to the brominated Freon depends upon the nature of the particular compound, it has been found that the molar ratio of the fluorine-containing hydrocarbon adjuvant to the brominated Freon (bromofluoro tetrahalomethane or hexaloethane) should range from 0.2 to 5. In addition, the combinations may be used directly or mixed with additives having low toxicity, propelling characteristics and high stability. Additives of this latter type include carbon dioxide and sulfur hexafluoride.

Example

To determine the lowest concentration of an extinguishing composition in air sufficient to prevent the spreading of a flame, we made use of an apparatus of the type described in detail by E. C. Creiz in "Journal of Research at the National Bureau of Standards," volume 65A, No. 4, July-August 1961, page 389.

Propane was used as the fuel and supplied with a feeding rate comprised between 150-250 cc./minute; supporter of combustion was air at a feed rate between 5 and 7 liters/minute.

In Table II the data obtained as the lowest concentration in the air at the moment of the extinction of the extinguishing agents tested alone or in mutual admixture are set forth.

For the extinguishing composition, constituted, according to the present invention, by mixtures of a brominated Freon with a propelling agent, besides the molar composition in percent, we have reported also the percentage difference between the quantity of composition theoretically necessary, calculated to extinguish the flame on the basis of the known extinguishing capacity of the single components, and the quantity which has been found to be actually necessary.

TABLE II

| | Agent | Composition in the liquid phase, percent mol | Lowest concentr., percent (mol) Theoretical | Lowest concentr., percent (mol) Actual | Difference, percent |
|---|---|---|---|---|---|
| 1 | $CF_2Br-CF_2Br$ | 99.7 | | 0.8 | |
| 2 | $CF_2Br_2$ | 97 | | 1.45 | |
| 3 | $CF_2ClBr$ | 99.4 | | 2.9 | |
| 4 | $CF_2Cl_2$ | 100 | | 6.6 | |
| 5 | $CF_2ClH$ | 99.6 | | 11.9 | |
| 6 | $CF_2ClBr$ / $CF_2Cl_2$ | 54 / 46 | 4.6 | 4.6 | 0 |
| 7 | $CF_2ClBr$ / $CF_2ClH$ | 52 / 48 | 6.9 | 5 | 27.5 |
| 8 | $CF_2Br-CF_2Br$ / $CF_2ClH$ | 50 / 50 | 6.1 | 1.75 | 71.5 |
| 9 | $CF_2Br_2$ / $CF_2ClH$ | 47 / 53 | 6.5 | 1.45 | 78 |

From the data listed in the table it can be seen how the mixtures 7, 8 and 9, according to the present invention, containing the different brominated Freon (actual extinguishing agents) and a fluorochlorohydrocarbon containing at least one hydrogen atom in the molecule ($CF_2ClH$), have flame-extinguishing powers far higher than those expected from their composition.

More particularly, as we can see from the above mentioned values, the efficiency being equal, for the extinguishing composition according to the present invention a lower consumption of brominated Freons is requested, i.e. up to 78%, in comparison with the theoretical consumption.

We claim:

1. A flame-extinguishing composition consisting essentially of at least one completely halogenated alkane selected from the group consisting of $CF_2Br-CF_2Br$, $CF_3Br$, $CF_2Br_2$ and $CF_2BrCl$, and at least one coadjuvant admixed therewith and selected from the group consisting of $CF_2ClH$, $CF_3H$, $CF_2H-CF_2H$ and $CF_2H_2$, the molar ratio of said coadjuvant to said completely halogenated alkane ranging between substantially 0.2 and 5.

2. A flame-extinguishing composition consisting essentially of the mixture of the completely halogenated alkane and the coadjuvant defined in claim 1, and a propellant selected from the group consisting of sulfur-hexafluoride and carbon dioxide.

References Cited

UNITED STATES PATENTS

| 2,653,130 | 9/1953 | Eiseman | 252—8 |
| 2,837,891 | 6/1958 | Stasiak | 252—8 |
| 3,276,999 | 10/1966 | Petit et al. | 252—8 |

FOREIGN PATENTS

| 227,557 | 3/1960 | Australia. |

OTHER REFERENCES

"Freon" Technical Bulletin, 1962, E. I. du Pont de Nemours, Wilmington, Del. (B–2) pp. 1–6 relied on.

MAYER WEINBLATT, Primary Examiner

U.S. Cl. X.R.

252—3